United States Patent
Pinney et al.

(10) Patent No.: US 9,475,261 B2
(45) Date of Patent: *Oct. 25, 2016

(54) DUAL LAYER SANDWICH FOR THERMAL MANAGEMENT

(71) Applicant: The Boeing Company, Chicago, IL (US)

(72) Inventors: Thomas R. Pinney, Long Beach, CA (US); Jonathan D. Embler, Tustin, CA (US); James P. Ledesma, Jr., Long Beach, CA (US); Leanne L. Lehman, Aliso Viejo, CA (US); Sangvavann Heng, Buena Park, CA (US)

(73) Assignee: THE BOEING COMPANY, Chicago, IL (US)

(*) Notice: Subject to any disclaimer, the term of this patent is extended or adjusted under 35 U.S.C. 154(b) by 286 days.

This patent is subject to a terminal disclaimer.

(21) Appl. No.: 14/532,488

(22) Filed: Nov. 4, 2014

(65) Prior Publication Data

US 2016/0046098 A1  Feb. 18, 2016

Related U.S. Application Data

(63) Continuation-in-part of application No. 14/462,175, filed on Aug. 18, 2014.

(51) Int. Cl.
| | | |
|---|---|---|
| *B64G 1/58* | (2006.01) | |
| *B32B 18/00* | (2006.01) | |
| *B32B 7/08* | (2006.01) | |
| *B32B 3/26* | (2006.01) | |
| *B32B 3/12* | (2006.01) | |

(52) U.S. Cl.
CPC . *B32B 7/08* (2013.01); *B32B 3/12* (2013.01); *B32B 3/266* (2013.01); *B32B 18/00* (2013.01); *B32B 2307/304* (2013.01); *B32B 2571/00* (2013.01); *B32B 2605/18* (2013.01); *C04B 2237/04* (2013.01); *C04B 2237/38* (2013.01)

(58) Field of Classification Search
CPC ..................................................... B32B 9/046
See application file for complete search history.

(56) References Cited

U.S. PATENT DOCUMENTS

| | | | | |
|---|---|---|---|---|
| 6,939,610 B1* | 9/2005 | Kaul | ...................... | B64G 1/226 428/323 |
| 7,281,688 B1* | 10/2007 | Cox | ......................... | B64G 1/58 244/159.1 |
| 7,931,962 B1* | 4/2011 | Willcockson | ............ | B64G 1/58 244/159.1 |
| 8,864,073 B1* | 10/2014 | Kim | .......................... | B64C 1/38 244/121 |
| 8,894,919 B1* | 11/2014 | Lehman | .................. | F16L 59/04 264/642 |
| 2007/0224407 A1* | 9/2007 | Covington | ................ | B32B 5/26 428/292.1 |

(Continued)

OTHER PUBLICATIONS

K. Hopp et al., "Innovative Materials & Processes Development for Structurally Integrated Thermal Protection Systems", National Space and Missile Materials Symposium, Tampa, FL, Jun. 25-28, 2012, pp. 1-24.

(Continued)

*Primary Examiner* — Stephen W Smoot
(74) *Attorney, Agent, or Firm* — MH2 Technology Law Group, LLP

(57) ABSTRACT

A thermal protection system including a plurality of layers. A first layer includes a passive insulation material. A second layer includes a phase change insulation material. A third layer is positioned between the first layer and the second layer to separate the passive insulation material from the phase change insulation material. A structural system extends through the first layer, the second layer, the third layer, or a combination thereof.

19 Claims, 5 Drawing Sheets

(56) References Cited

U.S. PATENT DOCUMENTS

| | | | | |
|---|---|---|---|---|
| 2011/0036953 A1* | 2/2011 | Andrews | ............... | B64G 1/58 244/171.8 |
| 2011/0284189 A1* | 11/2011 | Sinha | ............... | F02C 7/24 165/104.26 |

OTHER PUBLICATIONS

Dr. James L. Pittman et al., "Hypersonics Project, Fundamental Aeronautics Program", National Aeronautics and Space Administration, FAP Annual Meeting, Mar. 13, 2012, pp. 1-30.

Dr. Bill Garver, "Low Cost Lightweight High-Speed Structures", National Space & Missiles Materials Symposium, Jun. 25-28, 2012, pp. 1-23.

Brett Hauber et al., "Experimental Evaluation of Gap Thermal Resistance in a Hot Composite Structure", The Air Force Research Laboratory, Jun. 27, 2012, pp. 1-13.

Craig Iwano et al., "Innovatice Core Development for Structurally Integrated Thermal Protection System", National Space and Missile Materials Symposium, Jun. 25-28, 2012, pp. 1-26.

Leanne L. Lehman et al., "Method for Incorporation of Insulators and Bulk Absorbers in High Temperature Sandwich Structures After Fabrication", U.S. Appl. No. 13/552,235, filed Jul. 18, 2012.

* cited by examiner

DUAL LAYER SANDWICH FOR THERMAL MANAGEMENT

CROSS-REFERENCE TO RELATED APPLICATIONS

This application is a continuation-in-part of U.S. patent application having Ser. No. 14/462,175, filed on Aug. 18, 2014, which is incorporated herein in its entirety.

TECHNICAL FIELD

The present teachings relate to the field of thermal protection systems ("TPS") and, more particularly, to thermal protection systems used on hypersonic vehicles such as missiles, aircraft, spacecraft, and the like.

BACKGROUND

Vehicles travelling at hypersonic velocities may be exposed to high temperatures due to friction generated by contact with the passing fluid (e.g., air). For example, the nose and the leading edges of the wings of a spacecraft may be exposed high temperatures during re-entry into the atmosphere. To prevent these high temperatures from adversely affecting the vehicle, a thermal protection system is coupled to the outer surface or "skin" of the vehicle to insulate the vehicle.

The thermal protection system may include a plate made of a bonded ceramic insulating foam tile, ceramic, or a metallic standoff panel with an insulating blanket. The plate may be bonded or fastened to the skin of the vehicle. While the plate may insulate the vehicle from the heat, the weight of the plate may make the plate a very heavy addition for the vehicle to carry. As will be appreciated, it is desirable to keep the weight of airborne vehicles to a minimum. In addition to adding undesirable weight, the plate may have a thickness from about 2 cm to about 10 cm. As the thickness of the plate increases, the internal volume for other components decreases. Therefore, an improved thermal protection system for a hypersonic vehicle would be desirable.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A thermal protection system including a plurality of layers is disclosed. A first layer includes a passive insulation material. A second layer includes a phase change insulation material. A third layer is positioned between the first layer and the second layer to separate the passive insulation material from the phase change insulation material. A structural system extends through the first layer, the second layer, the third layer, or a combination thereof.

In another embodiment, the thermal protection system includes a first layer including a first ceramic matrix composite material. A second layer is coupled to the first layer, and the second layer includes a passive insulation material. A third layer is coupled to the second layer such that the second layer is positioned between the first and third layers. The third layer includes a second ceramic matrix composite material. A fourth layer is coupled to the third layer such that the third layer is positioned between the second and fourth layers. The fourth layer includes a phase change insulation material. A fifth layer is coupled to the fourth layer such that the fourth layer is positioned between the third and fifth layers. The fifth layer includes a third ceramic matrix composite material, a carbon reinforced plastic material, a carbon fiber reinforced plastic material, a polymer matrix composite material, or a combination thereof. A structural system may include first and second truss pins. The first truss pin may be coupled to the first layer and coupled to the third layer. The second truss pin may be coupled to the third layer and coupled to the fifth layer.

A vehicle including a thermal protection system is also disclosed. The vehicle includes a body and the thermal protection integrated with the body. The thermal protection system includes a first layer including a first ceramic matrix composite material. A second layer is coupled to the first layer, and the second layer includes a passive insulation material. A third layer is coupled to the second layer such that the second layer is positioned between the first and third layers. The third layer includes a second ceramic matrix composite material. A fourth layer is coupled to the third layer such that the third layer is positioned between the second and fourth layers. The fourth layer includes a phase change insulation material. A fifth layer is coupled to the fourth layer such that the fourth layer is positioned between the third and fifth layers. The fifth layer includes a third ceramic matrix composite material, a carbon reinforced plastic material, or a combination thereof. A structural system extends through the second layer, the third layer, the fourth layer, or a combination thereof.

The features, functions, and advantages that have been discussed can be achieved independently in various implementations or may be combined in yet other implementations further details of which can be seen with reference to the following description and drawings.

BRIEF DESCRIPTION OF THE DRAWINGS

The accompanying drawings, which are incorporated in and constitute a part of this specification, illustrate the present teachings and together with the description, serve to explain the principles of the disclosure. In the figures.

It should be noted that some details of the Figures have been simplified and are drawn to facilitate understanding of the present teachings rather than to maintain strict structural accuracy, detail, and scale.

DETAILED DESCRIPTION

Reference will now be made in detail to examples of the present teachings which are illustrated in the accompanying drawings. Wherever possible, the same reference numbers will be used throughout the drawings to refer to the same or like parts.

Figure 1:
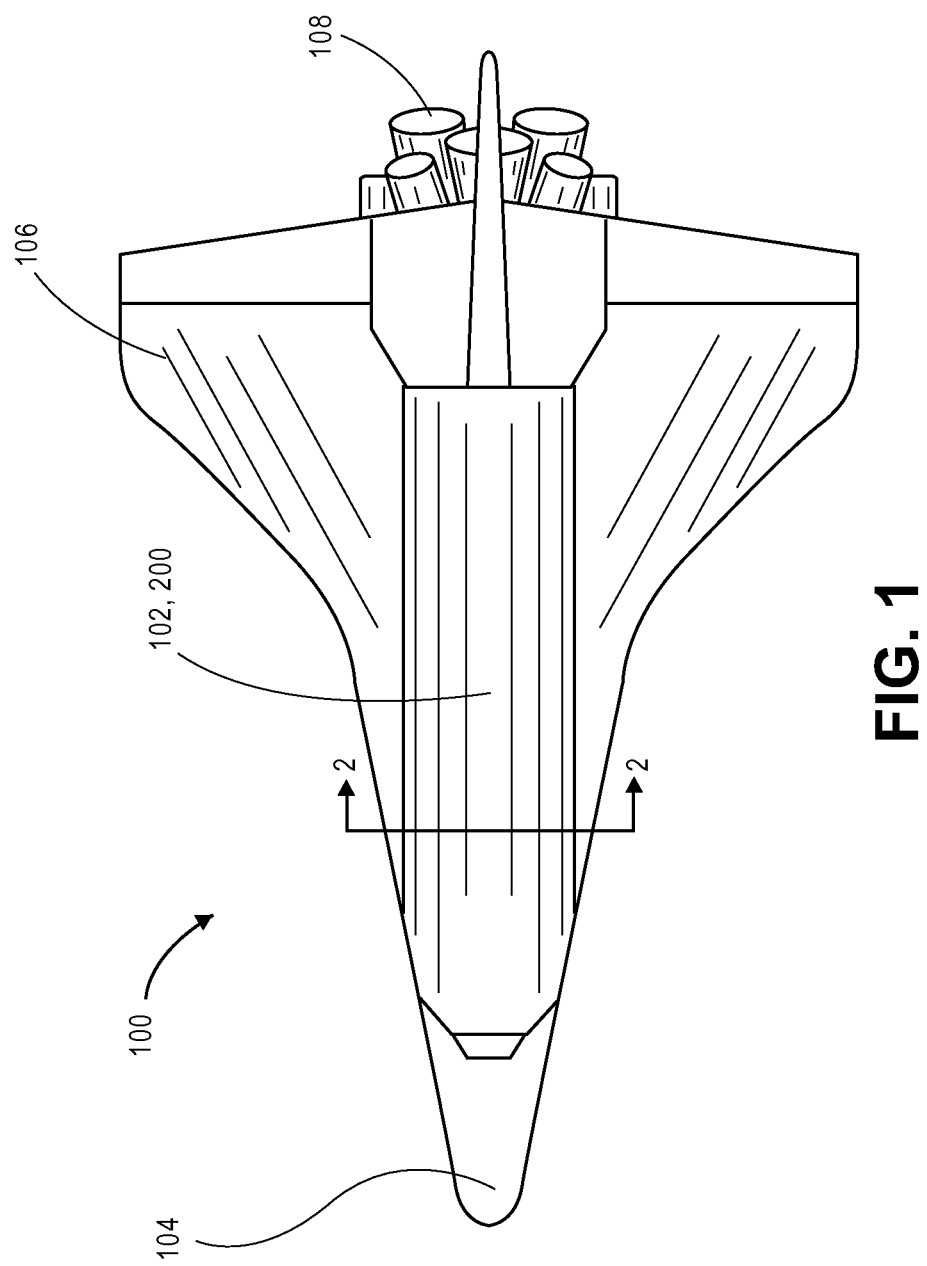
FIG. 1 is a top view of a vehicle having an illustrative thermal protection system.

FIG. 1 is a top view of a vehicle 100 having an illustrative thermal protection system 200. As shown, the vehicle 100 is a space shuttle. However, as will be appreciated, the vehicle 100 may be any vehicle that may be exposed to elevated temperatures (e.g., greater than about 260° C.). In at least one embodiment, the vehicle 100 may be a missile, a rocket, a spacecraft, etc. that may be exposed to elevated temperatures when travelling at supersonic speeds, hypersonic speeds, or greater speeds. In other embodiments, the vehicle 100 may be, for example, an airplane that is exposed to elevated temperatures proximate to a heat source such as an engine or exhaust port 108.

Figure 2:
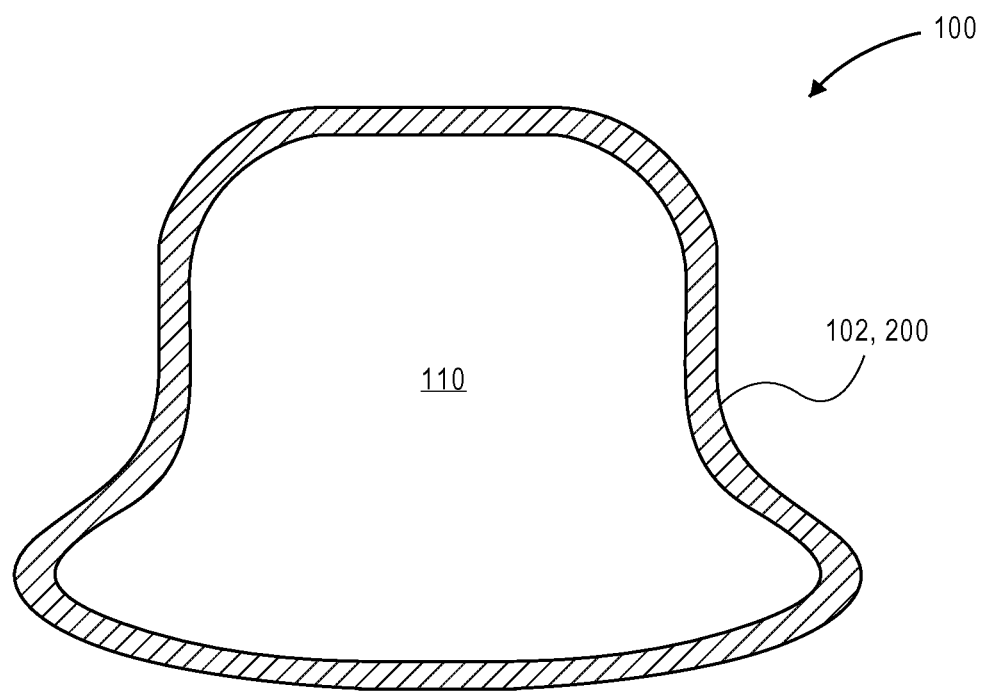
FIG. 2 is a cross-sectional view of the vehicle taken along line 2-2 in FIG. 1.

FIG. 2 is a cross-sectional view of the vehicle 100 taken along line 2-2 in FIG. 1. Referring to FIGS. 1 and 2, the vehicle 100 includes a body 102 that defines an inner volume 110. In at least one embodiment, the thermal protection system 200 is coupled to the body 102. However, as shown in FIG. 2, in another embodiment, the thermal protection system 200 is structurally integrated with the body 102 to avoid bonding or coupling the thermal protection system 200 to the body 102. This may be referred to as a structurally-integrated thermal protection system ("SITPS"). In this way, the thermal protection system 200 does not significantly increase the weight and/or decrease the volume 110 of the body 102. For example, the thermal protection system 200 may be a part of the body 102, and the first layer 210 (introduced below) of the thermal protection system 200 may serve as a portion of the outer surface or "skin" of the body 102.

The thermal protection system 200 may be positioned proximate to any portion of the body 102 that may be exposed to elevated temperatures. As such, the thermal protection system 200 may cover all or a portion of the body 102. For example, the thermal protection system 200 may be positioned proximate to the nose 104, the leading edges of the wings 106, the engine and/or exhaust ports 108, the landing gear door (not shown), a combination thereof, or the like.

Figure 3:
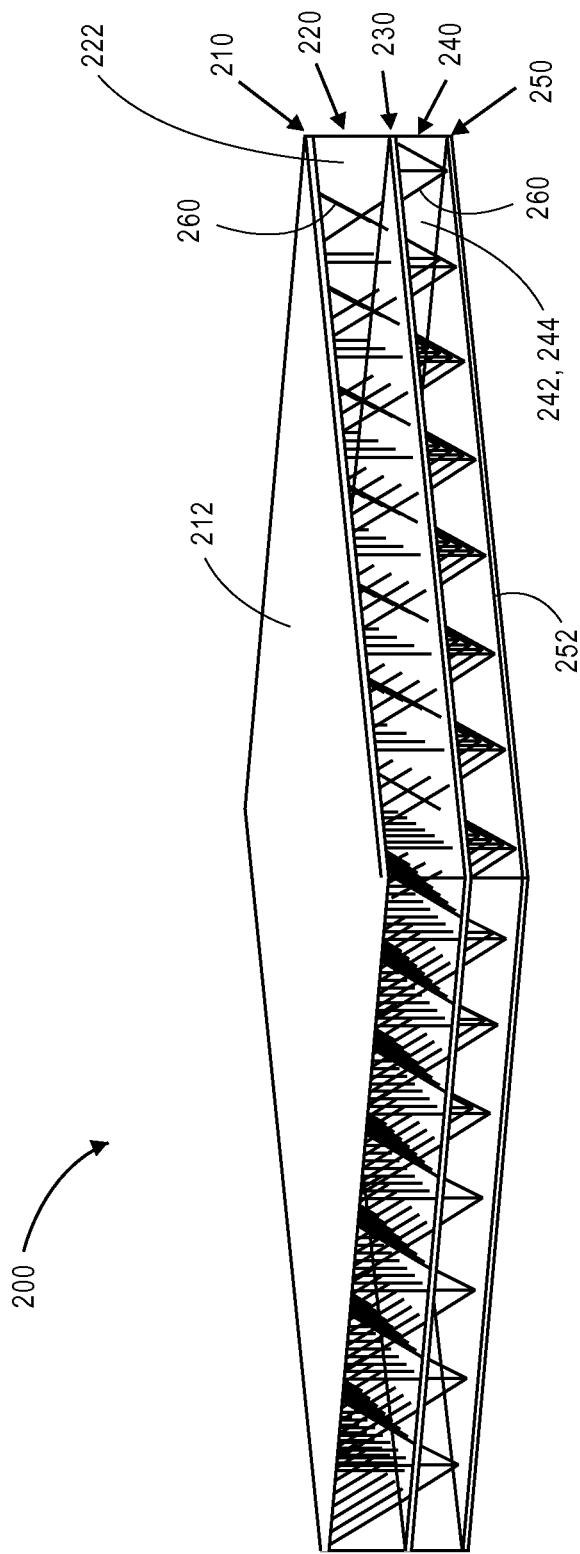
FIG. 3 is a cross-section of a perspective view of the thermal protection system shown in FIG. 1.
Figure 4:
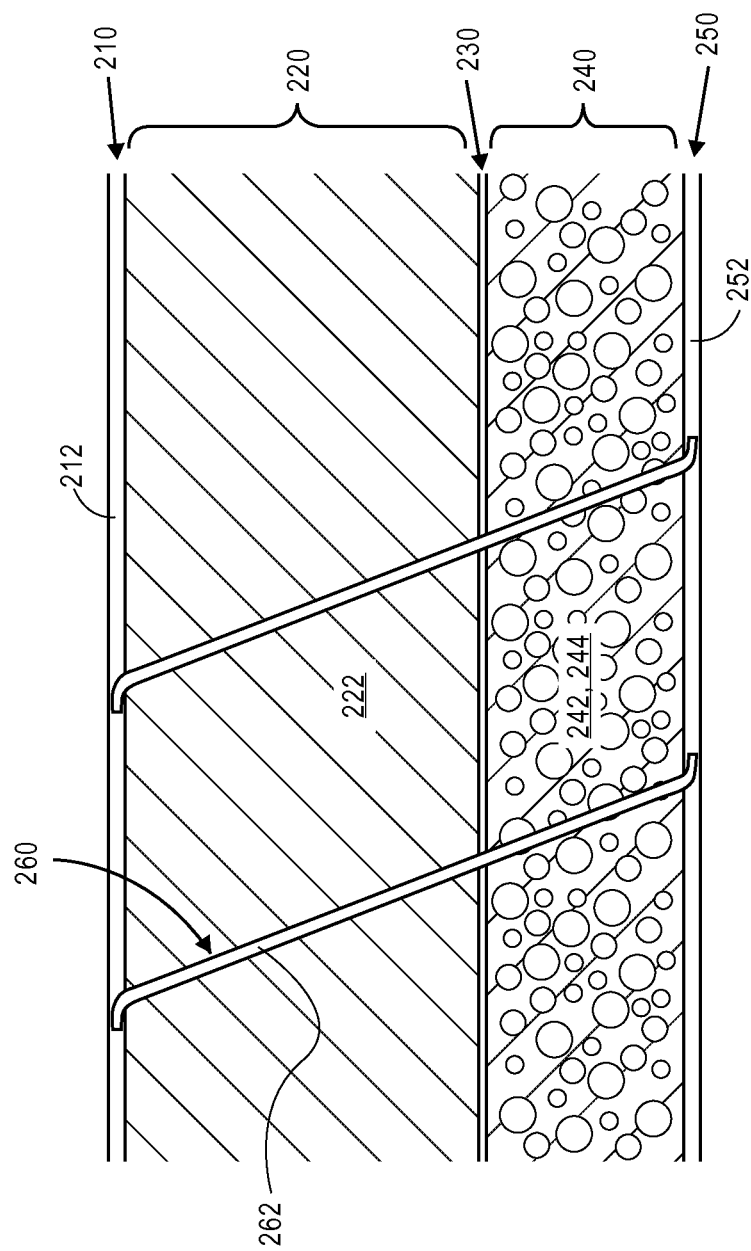
FIG. 4 is an enlarged cross-sectional view of a portion of the thermal protection system shown in FIG. 3.

FIG. 3 is a cross-section of a perspective view of the thermal protection system 200 shown in FIG. 1, and FIG. 4 is an enlarged cross-sectional view of a portion of the thermal protection system 200 shown in FIG. 3. The thermal protection system 200 is in the form of a sandwich structure including a plurality of layers (five are shown: 210, 220, 230, 240, 250). Although five layers 210, 220, 230, 240, 250 are shown, it will be appreciated that more or fewer layers may be used without departing from the scope of the disclosure.

The first or "outer" layer 210 may be referred to as an outboard facesheet layer. The outboard facesheet layer 210 has a thickness from about 0.5 mm to about 5 mm, about 1 mm to about 4 mm, or about 2 mm to about 3 mm. The outboard facesheet layer 210 is made of ceramic matrix composite ("CMC") materials 212.

The CMC materials 212 may be oxide-based and include truss, fluted-core, honeycomb, or other sandwich constructions including fiber reinforcements. The fiber reinforcements may include alumina (e.g., NEXTEL® 610), alumina mullite (e.g., NEXTEL® 720), aluminoborosilicate (e.g., NEXTEL® 312 or 440), quartz, glass, or a combination thereof (NEXTEL is a registered trademark of Minnesota Mining and Manufacturing Company of St. Paul, Minn.). The oxide-based CMC materials 212 may also include matrices that include alumina, aluminosilicate, alumina mullite, mullite glass, or a combination thereof.

The CMC materials 212 may also be non-oxide-based and include truss, fluted-core, honeycomb, or other sandwich constructions including fiber reinforcements. These fiber reinforcements may include carbon, silicon carbide, silicon nitride, silicon boride, silicon boronitride, or a combination thereof. The non-oxide-based CMC materials 212 may also include matrices that include carbon, silicon carbide, silicon nitride, silicon boride, hafnium carbide, zirconium carbide, other nitrides or carbides, or a combination thereof.

The second layer 220 is coupled to and positioned inward from the outboard facesheet layer 210. The second layer 220 is a sandwich layer that may serve as a passive insulation layer and is referred to as such going forward. The passive insulation layer 220 includes a passive insulation material 222. The passive insulation material 222 has a thickness from about 5 mm to about 50 mm, about 10 mm to about 40 mm, or about 15 mm to about 30 mm.

The passive insulation material 222 may be rigid or flexible. More particularly, the passive insulation material 222 may be a tile, a batting, a foam, or a combination thereof. The passive insulation material 222 may include ceramic fibers or batting including alumina, silica, or a combination thereof. The passive insulation material 222 may also include ceramic tile insulation. The ceramic tile insulation may be or include ceramic tile including alumina and silica fibers, alumina enhanced thermal barrier ("AETB"), or a combination thereof.

The third layer 230 is coupled to and positioned inward from the passive insulation layer 220. The third layer 230 may be referred to as a septum layer. The septum layer 230 has a thickness from about 0.1 mm to about 5 mm, about 0.25 mm to about 3 mm, or about 0.5 mm to about 2 mm.

The septum layer 230 may include any one or more of the materials listed above with respect to the outboard facesheet layer 210. The septum layer 230 may be made from the same materials as the outboard facesheet layer 210 or different materials.

The septum layer 230 may serve to separate the passive insulation layer 220 from the phase change insulation layer 240 (introduced below). More particularly, the septum layer 230 may be a non-porous layer that prevents the phase change insulation material 242 from entering or contacting the passive insulation material 222. This may allow the thermal protection system 200 to have a plurality of insulation layers (e.g., layers 220, 240). In at least one embodiment, the thickness of the septum layer 230 may be less than or equal to about 25% of the thickness of the passive insulation layer 220 and less than or equal to about 25% of the thickness of the phase change insulation layer 240.

The fourth layer 240 is coupled to and positioned inward from the septum layer 230. The fourth layer 240 is a sandwich layer similar to layer 220, but made of a different insulation material. For example, the fourth layer 240 includes a phase change insulation material 242 and is referred to as a phase change insulation layer going forward. The phase change insulation material 242 has a thickness from about 2 mm to about 25 mm, about 4 mm to about 20 mm, or about 6 mm to about 15 mm.

The phase change insulation layer 240 includes a carrier 244 (e.g., a ceramic foam carrier) having the phase change material 242 positioned therein. The carrier 244 may include silicon carbide, carbon, alumina, silica, or a combination thereof. The phase change material 242 may include melamine, lithium fluoride, germanium nitride, germanium oxide, gallium nitride, or a combination thereof.

The phase change material 242 may be in a solid phase when the thermal protection system 200 is exposed to a temperature that is less than or equal to a predetermined temperature. The predetermined temperature may be below the selected phase change material's temperature of decomposition. For example, the predetermined temperature may be from about 100° C. to about 300° C., about 300° C. to about 700° C., or about 700° C. to about 1400° C. However, as will be appreciated, the predetermined temperature may depend, at least partially, on the type of the phase change material 242, the composition of the phase change material 242, the duration of exposure to the temperature, or a combination thereof.

A lower predetermined temperature may keep the body 102 and/or interior volume 110 of the vehicle 100 cooler. However, the lower predetermined temperature may also maintain the outboard side of the phase change material 242 at a relatively low temperature, thereby reducing the amount of heat that is radiated outward from the body 102 of the vehicle 100. Radiation is one of the ways that heat is transferred from the body 102 of the vehicle 100. As such, the thermal protection system 200 may include the passive insulation material 222 on the outside to facilitate radiation and the phase change insulation material 242 on the inside to maintain the body 102 at a lower temperature.

When the phase change material 242 reaches or exceeds the predetermined temperature, the phase change material 242 may transform from the solid phase to a liquid phase. The phase change material 242 may remain encapsulated within the carrier 244 in both the solid and liquid phases. The heat energy may be converted and dissipated as the material 242 transforms from the solid phase to the liquid phase. This process may alter (e.g., slow) the rate of heat transfer from a hot exterior region to a cool interior region. Once the phase change material 242 falls below the predetermined temperature, the phase change material 242 transforms back into the solid phase.

The phase change material 242 may vaporize when exposed to a second, higher predetermined temperature. As with the first predetermined temperature, the second predetermined temperature may also depend at least partially, on the type of the phase change material 242, the composition of the phase change material 242, the duration of exposure to the temperature, or a combination thereof. The phase change material 242 may decompose after vaporizing. In at least one embodiment, the heat capacity including decomposition for a 1.3 cm thick phase change insulation layer 240 may range from about 2 kJ/cm$^2$ to about 35 kJ/cm$^2$ or more, depending on the type of phase change material 242.

The fifth layer 250 is coupled to the phase change insulation layer 240. The fifth layer 250 may be referred to as an inboard facesheet layer. The inboard facesheet layer 250 may serve as an inner surface of the body 102 of the vehicle 100. The inboard facesheet layer 250 has a thickness from about 0.5 mm to about 5 mm, about 1 mm to about 4 mm, or about 2 mm to about 3 mm. The outboard facesheet layer 210, the inboard facesheet layer 250, or both may be rigid to maintain the structure of the thermal protection system 200.

The inboard facesheet layer 250 may include any one or more of the materials listed above with respect to the outboard facesheet layer 210. For example, the inboard facesheet layer 250 may be made from the same materials as the outboard facesheet layer 210. In another example, the inboard facesheet layer 250 is made from different materials than the outboard facesheet layer 210.

The inboard facesheet materials 252 may also include carbon reinforced plastic ("CRP"), carbon fiber reinforced plastic ("CFRP"), or polymer matrix composite ("PMC"). The CFRP materials may include carbon, graphite, glass, aramid, or a combination thereof. The CRP and/or CFRP may also be or include matrices and/or resins including bismaleimide ("BMI"), epoxy, polyimide ("PI"), polyetheretherketone ("PEEK"), cyanate ester ("CE"), or a combination thereof.

As shown in FIG. 4, the thermal protection system 100 includes a structural system 260, such as a plurality of truss pins 262, for structural support. The truss pins 262 are coupled to the outboard and inboard facesheet layers 210, 250. More particularly, ends of the truss pins 262 are embedded in the outboard and inboard facesheet layers 210, 250. The truss pins 262 may extend through the passive insulation layer 220, the septum layer 230, and the phase change insulation layer 240 (including the carrier 244). The passive insulation material 222 and the phase change insulation material 242 may surround the truss pins 262.

The truss pins 262 may be optional when the passive insulation material 222 and/or the carrier 244 are structural. For example, instead of, or in addition to, the truss pins 262, the structural system 260 may include flutes, baffles, honeycombs, a combination thereof, or the like for structural support.

Figure 5:
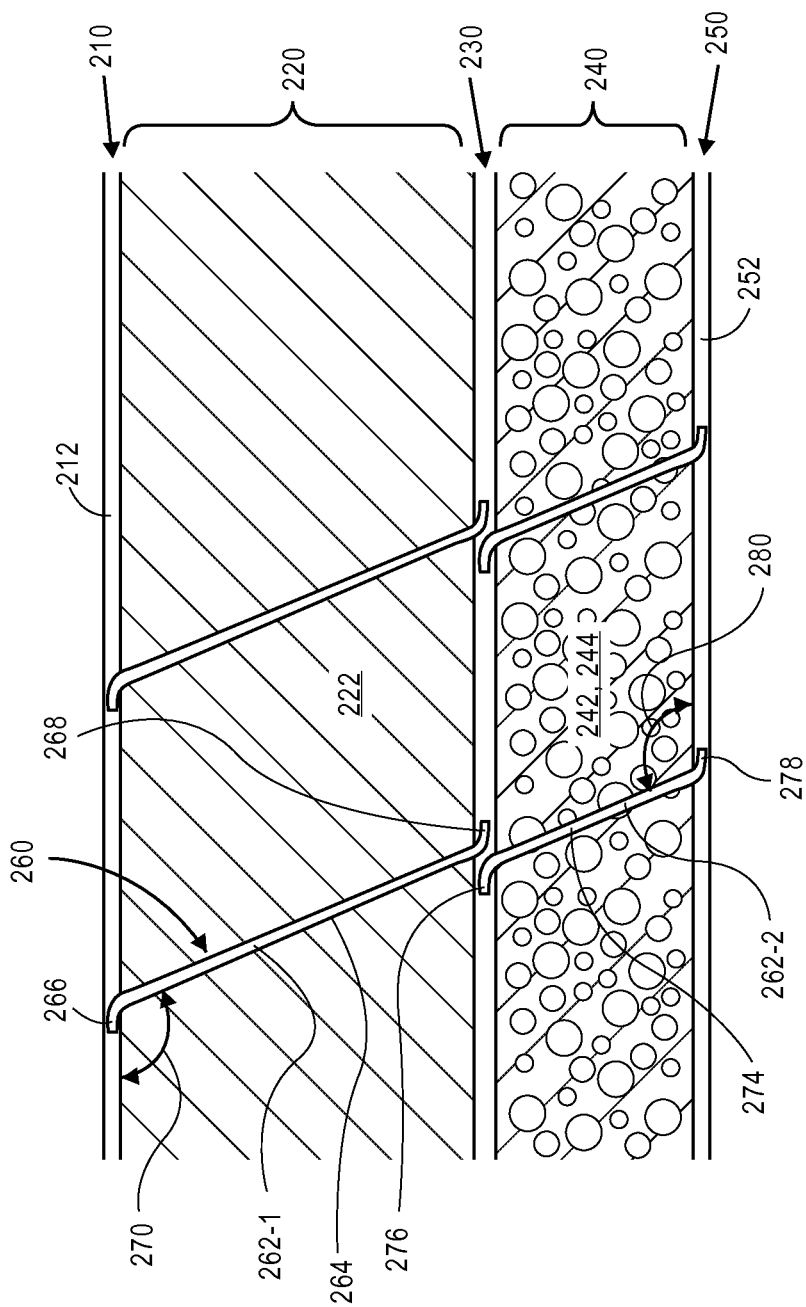
FIG. 5 is another enlarged cross-sectional view of a portion of the thermal protection system shown in FIG. 3.

FIG. 5 is another enlarged cross-sectional view of the structural system 260 shown in FIG. 3 showing a first plurality of truss pins 262-1 coupled to the outboard facesheet layer 210 and the septum layer 230 and a second plurality of truss pins 262-2 coupled to the septum layer 230 and the inboard facesheet layer 250. As used with respect to the truss pins, "coupled to" refers to the pins being embedded in, extending through, being attached directly to a surface of, or being attached indirectly to a surface of a layer. The truss pins 262-1 include a body 264 and opposing ends 266, 268. The bodies 264 of the truss pins 262-1 extend through the passive insulation layer 220. As such, the passive insulation material 222 may surround the bodies 264 of the truss pins 262-1.

As shown, the ends 266, 268 are curved, bent, and/or angled with respect to the body 264. For example, the ends 266, 268 may be oriented at an angle 270 with respect to the body 264. The angle 270 may be from about 45° to about 75°, about 75° to about 105°, about 105° to about 135°, or about 45° to about 135°. The ends 266, 268 of the truss pins 262-1 may be substantially parallel to the outboard facesheet layer 210, the septum layer 230, or both. As such, the body 264 may be oriented at the angle 270 with respect to the outboard facesheet layer 210, the septum layer 230, or both.

The truss pins 262-1 are coupled to the outboard facesheet layer 210. As shown, the first ends 266 may be embedded in the outboard facesheet layer 210. In another embodiment, the truss pins 262-1 may extend through the outboard facesheet layer 210 such that the first ends 266 are positioned on the opposite side of the outboard facesheet layer 210 from the bodies 264. In this embodiment, the bent first ends 266 may secure the truss pins 262-1 to the outboard facesheet layer 210. In yet another embodiment, the first ends 266 may be secured to the outboard facesheet layer 210 with an adhesive.

The truss pins 262-1 are also coupled to the septum layer 230. As shown, the second ends 268 may be embedded in the septum layer 230. In another embodiment, the truss pins 262-1 may extend through the septum layer 230 such that the second ends 268 are positioned on the opposite side of the septum layer 230 from the bodies 264. In this embodiment, the bent second ends 268 may secure the truss pins 262-1 to the septum layer 230. In yet another embodiment, the second ends 268 may be secured to the septum layer 230 with an adhesive.

Similarly, the truss pins 262-2 include a body 274 and opposing ends 276, 278. The bodies 274 of the truss pins 262-2 extend through the phase change insulation layer 240 (including the carrier 244). As such, the phase change insulation material 242 may surround the bodies 274 of the truss pins 262-2.

As shown, the ends 276, 278 are curved, bent, and/or angled with respect to the body 274. For example, the ends 276, 278 may be oriented at an angle 280 with respect to the body 274. The angle 280 may be from about 45° to about 75°, about 75° to about 105°, about 105° to about 135°, or about 45° to about 135°. The angle 280 may be the same as or different than the angle 270. The ends 276, 278 of the truss pins 262-2 may be substantially parallel to the septum layer 230, the inboard facesheet layer 250, or both. As such, the body 274 may be oriented at the angle 280 with respect to the septum layer 230, the inboard facesheet layer 250, or both.

The truss pins 262-2 are coupled to the septum layer 230. As shown, the first ends 276 may be embedded in the septum layer 230. In another embodiment, the truss pins 262-2 may extend through the septum layer 230 such that the first ends 276 are positioned on the opposite side of the septum layer 230 from the bodies 274. In this embodiment, the bent first ends 276 may secure the truss pins 262-2 to the septum layer 230. In yet another embodiment, the first ends 276 may be secured to the septum layer 230 with an adhesive.

The truss pins 262-2 are also coupled to the inboard facesheet layer 250. As shown, the second ends 278 may be embedded in the inboard facesheet layer 250. In another embodiment, the truss pins 262-2 may extend through the inboard facesheet layer 250 such that the second ends 278 are positioned on the opposite side of the inboard facesheet layer 250 from the bodies 274. In this embodiment, the bent second ends 278 may secure the truss pins 262-2 to the inboard facesheet layer 250. In yet another embodiment, the second ends 278 may be secured to the inboard facesheet layer 250 with an adhesive.

Referring to FIGS. 2-5, the thermal protection system 200 may behave as a single layer. For example, the outboard and inboard facesheet layers 210, 250 may be in tension and compression as if there is only one insulation layer in the system, even though there are two (or more) insulation layers 220, 240. The septum layer 230 does not affect the structure of the insulation layers 220, 240, but the septum layer 230 may prevent the structural system 260 from buckling during expansion and contraction of the insulation layers 220, 240.

With high thermal loading, the outboard facesheet layer 210 and the passive insulation layer 220 may approach the temperature of the exterior environment, thus reducing the rate of heat transfer. The passive insulation layer 220 may absorb a portion of the heat, and the phase change insulation layer 240 may dissipate an additional portion of the heat as the phase change insulation layer 240 changes phases (e.g., melts or evaporates).

The thermal protection system 200 disclosed herein may provide substantially equivalent heat protection as a conventional system including a passive insulation layer (but no phase changing insulation layer) while occupying less thickness, weight per unit area, and/or volume. Similarly, the thermal protection system 200 disclosed herein may provide substantially equivalent heat protection as a different conventional system including a phase changing insulation layer (but no passive insulation layer) while occupying less thickness, weight per unit area, and/or volume.

The thermal protection system 200 disclosed herein may be more durable (e.g., "all weather") compared to conventional parasitic blankets and tiles. In addition, the thermal protection system 200 may be lower weight and have a lesser thickness than parasitic standoff panels, blankets, or single layer thermal protection systems. As hypersonic vehicles 100 tend to be highly volume-constrained, a thermal protection system 200 having equivalent heat protection with a lesser thickness compared to the conventional systems mentioned above may improve the performance of the vehicle 100. This lesser thickness with equivalent heat protection may be achieved, at least partially, by the addition of the phase change insulation layer 240 as part of the sandwich structure. The thermal protection system 200 may also provide packaging and integration benefits in applications such as landing gear doors, where the added stiffness of the thermal protection system 200 sandwich structure may minimize sealing and flutter issues (compared to a parasitic thermal protection system over a thin structural door panel).

Although two insulation layers 220, 240 are shown and described, it will be appreciated that other embodiments may use three or more insulation layers. Although the insulation layers 220, 240 are described above as being made of a passive insulation material 222, and a phase changing insulation material 242, respectively, it will be appreciated that these are merely illustrative embodiments. For example, the layers 220, 240 may both be made of a passive insulation material 222. In another example, the layers 220, 240 may both be made of a phase change insulation material 242. In yet another example, the layer 220 may be made of a phase change insulation material 242, and the layer 240 may be made of a passive insulation material 222. Although passive insulation materials 222 and phase change insulation materials 242 are disclosed, other insulation materials are also contemplated herein.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. It will be appreciated that structural components and/or processing stages can be added or existing structural components and/or processing stages can be removed or modified. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected.

Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the present teachings. Finally, "exemplary" indicates the description is used as an example, rather than implying that it is an ideal. The present disclosure provides specific implementations without being exhaustive, and other implementations of the present teachings may be apparent to those skilled in the art from consideration of the specification and practice of the disclosure herein. It is intended that the specification and examples be considered as exemplary only, with a true scope and spirit of the present teachings being indicated by the following claims.

The invention claimed is:

1. A thermal protection system, the system comprising:
    a first layer comprising a passive insulation material;
    a second layer comprising a phase change insulation material;
    a third layer positioned between the first layer and the second layer to separate the passive insulation material from the phase change insulation material; and
    a structural system that extends through the first layer, the second layer, or a combination thereof, and wherein the structural system comprises a truss pin that is coupled to the third layer.

2. The thermal protection system of claim 1, wherein the structural system further comprises one or more additional truss pins, flutes, baffles, honeycombs, or a combination thereof.

3. The thermal protection system of claim 1, wherein the truss pin extends through the first layer, the second layer, and the third layer.

4. The thermal protection system of claim 1, wherein an end of the truss pin is embedded in the third layer.

5. The thermal protection system of claim 1, wherein an end of the truss pin is oriented at an angle with respect to a body of the truss pin, and wherein the angle is from about 45° to about 135°.

6. The thermal protection system of claim 5, wherein the end of the truss pin is on an opposite side of the third layer from the body.

7. The thermal protection system of claim 5, wherein the end of the truss pin is substantially parallel with the third layer.

8. A thermal protection system, the system comprising:
    a first layer comprising a first ceramic matrix composite material;
    a second layer coupled to the first layer, the second layer comprising a passive insulation material;
    a third layer coupled to the second layer such that the second layer is positioned between the first and third layers, the third layer comprising a second ceramic matrix composite material;
    a fourth layer coupled to the third layer such that the third layer is positioned between the second and fourth layers, the fourth layer comprising a phase change insulation material;
    a fifth layer coupled to the fourth layer such that the fourth layer is positioned between the third and fifth layers, the fifth layer comprising a third ceramic matrix composite material, a carbon reinforced plastic material, a carbon fiber reinforced plastic material, a polymer matrix composite material, or a combination thereof; and
    a structural system comprising:
        a first truss pin coupled to the first layer and the third layer; and
        a second truss pin coupled to the third layer and the fifth layer.

9. The thermal protection system of claim 8, wherein a first end of the first truss pin is embedded in the first layer.

10. The thermal protection system of claim 9, wherein a second end of the first truss pin is embedded in the third layer.

11. The thermal protection system of claim 8, wherein the first truss pin extends through the first layer such that an end of the first truss pin is positioned on an opposite side of the first layer from a body of the first truss pin.

12. The thermal protection system of claim 11, wherein the end of the first truss pin is oriented at an angle with respect to the body of the first truss pin, and wherein the angle is from about 45° to about 135°.

13. The thermal protection system of claim 12, wherein the end of the first truss pin is substantially parallel with the first layer.

14. The thermal protection system of claim 8, wherein the first truss pin extends through the second layer, and wherein the second truss pin extends through the fourth layer.

15. A vehicle comprising:
    a body; and
    a thermal protection system integrated with the body, the thermal protection system comprising:
        a first layer comprising a first ceramic matrix composite material;
        a second layer coupled to the first layer, the second layer comprising a passive insulation material;
        a third layer coupled to the second layer such that the second layer is positioned between the first and third layers, the third layer comprising a second ceramic matrix composite material;
        a fourth layer coupled to the third layer such that the third layer is positioned between the second and fourth layers, the fourth layer comprising a phase change insulation material;
        a fifth layer coupled to the fourth layer such that the fourth layer is positioned between the third layer and the fifth layer, the fifth layer comprising a third ceramic matrix composite material, a carbon reinforced plastic material, or a combination thereof; and
        a structural system that extends through the second layer, the third layer, the fourth layer, or a combination thereof.

16. The vehicle of claim 15, wherein the structural system comprises:
    a first truss pin coupled to the first layer and coupled to the third layer; and
    a second truss pin coupled to the third layer and coupled to the fifth layer.

17. The vehicle of claim 16, wherein a first end of the first truss pin is embedded in the first layer.

18. The vehicle of claim 16, wherein the first truss pin extends through the first layer such that an end of the first truss pin is positioned on an opposite side of the first layer from a body of the first truss pin.

19. The vehicle of claim 18, wherein the end of the first truss pin is substantially parallel with the first layer.

* * * * *